(12) United States Patent
Fahrbach (10) Patent No.: US 11,686,929 B2
(45) Date of Patent: Jun. 27, 2023

(54) LIGHT SHEET MICROSCOPE WITH EXCHANGEABLE OPTICAL ELEMENTS

(71) Applicant: Leica Microsystems CMS GmbH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 430 days.

(21) Appl. No.: 17/020,885

(22) Filed: Sep. 15, 2020

(65) Prior Publication Data
US 2021/0088767 A1    Mar. 25, 2021

(30) Foreign Application Priority Data
Sep. 20, 2019   (EP) .................................. 19198728

(51) Int. Cl.
*G02B 21/18* (2006.01)
*G02B 21/04* (2006.01)
*G02B 21/00* (2006.01)

(52) U.S. Cl.
CPC ....... *G02B 21/0048* (2013.01); *G02B 21/008* (2013.01); *G02B 21/0032* (2013.01); *G02B 21/04* (2013.01); *G02B 21/18* (2013.01)

(58) Field of Classification Search
None
See application file for complete search history.

(56) References Cited

U.S. PATENT DOCUMENTS

| 2016/0327779 | A1* | 11/2016 | Hillman | G02B 21/0032 |
| 2017/0023784 | A1 | 1/2017 | Quintas et al. | |
| 2019/0049709 | A1* | 2/2019 | Shimada | G02B 6/0008 |
| 2019/0056579 | A1 | 2/2019 | Kalkbrenner et al. | |
| 2020/0408691 | A1* | 12/2020 | Vladimirov | G02B 21/18 |

FOREIGN PATENT DOCUMENTS

| EP | 0 324 424 A1 | 7/1989 |
| JP | H03180743 A | 8/1991 |
| JP | 3292493 B2 | 6/2002 |
| WO | WO 2018/089865 A1 | 5/2018 |

* cited by examiner

Primary Examiner — Derek S. Chapel
(74) Attorney, Agent, or Firm — Leydig, Voit & Mayer, Ltd.

(57) ABSTRACT

A light sheet microscope, such as an oblique plane microscope or a swept confocally-aligned planar excitation (SCAPE) microscope, includes an optical system with a first optical element, a second optical element and a mirror assembly. In a first operational state of the microscope, the optical system is configured to transmit illumination light along a first illumination light path through the first optical element into a first sample volume, and configured to transmit observation light along a first observation light path from the first sample volume to a detector device. In a second operational state of the microscope, the optical system is configured to transmit the illumination light along a second illumination light path via the mirror assembly through the second optical element into a second sample volume, and configured to transmit observation light along a second observation light path from the second sample volume to the detector device.

15 Claims, 4 Drawing Sheets

LIGHT SHEET MICROSCOPE WITH EXCHANGEABLE OPTICAL ELEMENTS

CROSS-REFERENCE TO PRIOR APPLICATION

Priority is claimed to European Patent Application No. EP 19198728.8, filed on Sep. 20, 2019, the entire disclosure of which is hereby incorporated by reference herein.

FIELD

The invention relates to a light sheet microscope, in particular an oblique plane microscope or a swept confocally-aligned planar excitation (SCAPE) microscope, comprising an optical system with at least one first optical element, at least one second optical element and a mirror assembly.

BACKGROUND

Light sheet microscopes of the art are known, wherein parameters of the microscopes like magnification, numerical aperture and the like are commonly fixed. Modification of such a parameter of a light sheet microscope is cumbersome and time consuming.

SUMMARY

In an embodiment, the present invention provides a light sheet microscope, such as an oblique plane microscope or a swept confocally-aligned planar excitation (SCAPE) microscope, including an optical system with at least one first optical element, at least one second optical element and a mirror assembly. In a first operational state of the microscope, the optical system is configured to transmit illumination light along a first illumination light path through the at least one first optical element into a first sample volume, and configured to transmit observation light along a first observation light path from the first sample volume to a detector device. In a second operational state of the microscope, the optical system is configured to transmit the illumination light along a second illumination light path via the mirror assembly through the at least one second optical element into a second sample volume, and configured to transmit observation light along a second observation light path from the second sample volume to the detector device.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In an embodiment, the present invention provides a light sheet microscope that facilitates modification of the microscope parameters and that increases the microscope's versatility.

In an embodiment, the present invention solves the above problem for the light sheet microscope mentioned in the beginning, in that, in a first operational state of the microscope, the optical system is configured to transmit illumination light along a first illumination light path through the at least one first optical element into a first sample volume and configured to transmit observation light along a first observation light path from the first sample volume to a detector device, and in that, in a second operational state of the microscope, the optical system is configured to transmit the illumination light along a second illumination light path via the mirror assembly through the at least one second optical element into a second sample volume and configured to transmit observation light along a second observation light path from the second sample volume to the detector device.

The inventive light sheet microscope has thus the advantage that it allows for selecting at least from the first optical element and the second optical element an optical element through which a sample volume is illuminated and through which observation light from said sample volume is received for transmitting it towards the detector device.

Embodiments of the inventive light sheet microscope may be further improved by additional technical features described in the following. Those additional technical features may be arbitrarily combined with each other or may be omitted if the technical effect obtained with the omitted technical feature is not relevant to the present invention.

The light sheet microscope may comprise three or more optical elements, wherein the invention allows for selecting one of said optical elements. The light sheet microscope thus may allow for selecting one optical element out of an arbitrary number of optical elements. Selecting one of said optical elements is to be understood as providing an operational state of the microscope in which an illumination light path and an observation light path pass through said optical element.

The optical element or optical elements may be objectives. The optical elements may differ from each other in at least one of the direction of the corresponding optical axis, a magnification, a numerical aperture and the material and corresponding optical properties of the optical elements. This list of properties is not completed and further properties of the optical elements may differ for at least two optical elements used in the light sheet microscope.

A light sheet microscope being in a first or second operational state may be understood as one or several features of the light sheet microscope being in a first or second position.

In particular the mirror assembly may be in a first operational position in the first operational state, and may be moved into a second operational position in the second operational state.

The inventive light sheet microscope thus allows to switch between a first and a second illumination light path of at least two different illumination light paths. An arbitrary number of different light paths is conceivable, wherein the number may be limited by the geometry of the microscope and the available space.

The at least two different illumination light paths may be, at least in portions, oriented collinearly to each other, i.e. be identical. Preferably, the light paths may be identical from an illumination source to the second operational position of the mirror assembly.

Each of the observation light paths may be defined by the corresponding illumination light path. A first illumination light path, along which illumination light is transmitted into the first sample volume thus defines the first observation light path or may at least define limitations of the position of the first observation light path. Preferably, in the sample volume, the observation light path may be oriented essentially perpendicular to the illumination light path. More preferably, an angle between observation light path and illumination light path is between 0° and 90°. Even more preferably, this angle is between 45° and 90°, for example around 60°.

Further, the first illumination light path and the first observation light path are assigned to the first sample volume. Accordingly, the second illumination light path and the second observation light path are assigned to the second sample volume. Accordingly, a third or fourth sample volume with the corresponding light paths may be provided. The number of possible sample volumes is only limited by geometrical limitations of the light sheet microscope.

In the first operational position of the mirror assembly, the first illumination light path may bypass the mirror assembly.

In one embodiment of the inventive light sheet microscope, the mirror assembly may be configured to be at least one of linearly and rotatably moveable from the first operational position to the second operational position.

Thus, in the first operational state, the first illumination light path and the first observation light path may bypass the mirror assembly, whereas in the second operational state the mirror assembly may be located in the second illumination light path and in the second observation light path.

As mentioned above, the two or more illumination light paths and the two or more observation light paths may overlap in section, wherein the second operational position of the mirror assembly may define a branching point for the illumination light paths, respectively a combination point for the observation light paths. Preferably, according to the operational state of the light sheet microscope, only one illumination light path and only one observation light path is selected by means of the operational position of the mirror assembly.

The mirror assembly may comprise at least one mirror. It is also conceivable that the mirror assembly comprises two or more mirrors for redirecting the illumination light path and the corresponding observation light path to a corresponding optical element. Apart from the first illumination light path and the first observation light path (both bypassing the mirror assembly), the mirror assembly may define further at least a second illumination and observation light path by a second operational position. The mirror assembly of the light sheet microscope may further define a third illumination and observation light path by a third operational position. Accordingly, a fourth, fifth, up to n-th operational position of the mirror assembly may be possible. In each operational position a different mirror (or different number of mirrors) may be provided in the illumination and observation light path.

For each operational position, the mirror assembly may be in a pre-adjustment-state. If the inventive light sheet microscope has more than two operational positions, e.g. three operational positions, a first mirror of the mirror assembly may be provided in the illumination and observation light path in the second operational position of the mirror assembly, whereas, a second mirror of the mirror assembly may be provided in the illumination and observation light path in the third operational position of the mirror assembly. Thus, in the third operational position of the mirror assembly, the third illumination light path and the third observation light path may bypass the first mirror of the mirror assembly. Consequently, different mirrors, each of which may provide a preadjustment, may be used for directing illumination and observation light along the second, third, up to n-th illumination and observation light path.

Preferably a back focal plane/a pupil of the first optical element and the second optical element (in other embodiments of the microscope also of the further optical elements like the third, fourth, up to n-th optical element) are located at the same position in the light sheet microscope. In general, the back focal plane of an optical element is the Fourier plane of the focal plane of the optical element lying in the sample or in a further plane conjugate to this plane. Thus, e.g. for the first optical element, the corresponding back focal plane is a focal plane located opposite the first sample volume. This definition of the back focal plane may be applied to a second optical element and a second sample volume; as well as to possible further, e.g. third etc optical elements and sample volumes. It is further particularly advantageous if the back focal plane/pupil of all optical elements, i.e. the first, second, third, etc n-th optical elements do coincide with a further focal plane of an objective that generates an oblique virtual image, which is subsequently imaged onto the detector device by an optical assembly oriented in an oblique manner with respect to the other optical components.

The focusing angles of the optical elements (first, second, third, etc.) may be the same, i.e. $M\_1/n\_1 = M\_2/n\_2$ may apply where M is the magnification given by the ratio of the tube lens and the objective $M = f\_Tube/f\_Objective$. Thus, as an example: $f\_Tube = 200$ mm, $f\_Objective = 10$ mm → $M = 20$ the variable n is the refractive index that the lens is optimized for, i.e. $n\_1 = 1.33$ for a water immersion lens. In cases in which the equation above does not match, an intermediate telescope may be required. According to this disclosure, the suggested way to match the equation is to have matching focal lengths of the tube lenses f_tube in each of the beam paths.

The optical elements are preferably fixed in their position and configured i.e., adjusted such that their focal planes/pupils overlap as described above. Thus, by a guided linear movement of the optical assembly, changing the operational states of the light sheet microscope is easily performed without the need of readjustment. Prior art solutions that e.g. apply a rotatable revolver may not provide such an accuracy and require cumbersome and time-consuming readjustment.

In another embodiment of the light sheet microscope, the mirror assembly may be configured to be moved along an insertion direction into the first illumination light path, wherein the insertion direction is one of:
- essentially perpendicular to the first illumination light path;
- essentially parallel to a reflection surface of the mirror assembly; and
- essentially perpendicular to a reflection plane at the mirror assembly in the second operational state.

The mirror assembly may be preferably moved linearly into the first illumination light path.

In another embodiment of the light sheet microscope, the optical system may comprise a first tube lens and a second tube lens, wherein the first tube lens may be provided in the first illumination light path, and wherein the second tube lens may be provided in the second illumination light path. Accordingly, a third or fourth tube lens may be provided in the third or fourth illumination light path, respectively. Preferably, in each operational state of the light sheet microscope one tube lens, through which the illumination light path (preferably also the observation light path) is directed, is applied.

The tube lens may be adapted in terms of numerical apertures, focal distance or magnification to the corresponding first, second, third or n-th optical element. The mirror assembly in the first, second, third or n-th operational position as well as the first, second, third or n-th tube lens may be pre-adjusted. Such a preadjustment may preferably result in a partially collinear arrangement of all illumination light paths from a light source to a branching point (at this point at least a first mirror of the mirror assembly is located in the second, third or n-th operational position) and in a partially collinear arrangement of all observation light paths from a combination point to the detector device.

Most preferably, the optical element provided in one of the plurality of illumination light paths and/or the corresponding tube lens are attached at a fixed position with respect to the microscope and only the mirror assembly is moved.

However, at least one of the second tube lens and the at least one second optical element may be configured to be moved together with the mirror assembly from the first operational position into the second operational position, wherein in the second operational position the second tube lens and/or the at least one second optical element is inserted into the second illumination light path. The mirror assembly may comprise a further tube lens (e.g. a third tube lens). Said one or more further tube lens(es) may be configured to be moved together with the mirror assembly.

It is also conceivable that the mirror assembly comprises different, independently movable mirrors. Together with each of said independently movable mirrors an accordingly independently movable tube lens may be provided.

Exemplarily, a first tube lens may be provided in the first illumination light path (preferably also in the first observation light path), i.e. when the mirror assembly is bypassed. In the second operational position of the mirror assembly, a first mirror may be moved (optionally together with a second tube lens) into the first illumination light path, thereby defining the second illumination light path. A third operational position of the mirror assembly is conceivable, in which a second mirror may be moved (optionally together with a third tube lens) into the first illumination light path, thereby defining a third illumination light path. Movement of the first mirror (and the second tube lens) may be independent on a movement of the second mirror (and the third tube lens). Said movement may be in particular along different directions. Said directions may be oriented perpendicular to each other.

In a further embodiment of the light sheet microscope, in the first illumination light path, the first tube lens of the optical system may be located between the at least one first optical element and the second operational position of the mirror assembly. This allows to bypass the first tube lens if the mirror assembly is moved into the second operational position.

Thus, if an inventive light sheet microscope is considered that comprises the first operational state and the second operational state (without excluding further operational states) different possibilities for switching between the states are possible. First, only the mirror assembly is moved from the first operational position to the second operational position for transmitting the illumination light along the second illumination light path wire the mirror assembly through the at least one second optical element into the second sample volume. Here, the second optical element (which may be an objective) and the second tube lens are stationary with respect to the light sheet microscope and are not moved when changing the operational state. Second, the second tube lens may be moved together with the mirror assembly, wherein the second optical element remains stationary. Third, the mirror assembly, the tube lens and the second optical element are altogether moved into the second operational position.

Thus, for each operational state the light sheet microscope may provide a combination of tube lens and optical element.

Each of these combinations is configured for observation of a sample volume. The sample volumes may be different in at least one of position and orientation for each operational state.

It is for instance conceivable that an inventive light sheet microscope comprises three operational states, wherein in the first operational state the light sheet microscope is configured for observation from a side (i.e. perpendicularly with respect to an up down direction defined by gravity), whereas in the second operational state a sample provided in the second sample volume may be observed from above, i.e. with illumination along the direction of gravity. Additionally, in a third operational state the light sheet microscope may be configured to observe a sample from below, i.e. with illumination against the direction of gravity.

In a further embodiment of the inventive light sheet microscope, a ratio of focal lengths of the second optical element and the second tube lens may be essentially equal to the ratio of focal lengths of the at least one first optical element and the first tube lens. This provides equal path lengths of the illumination and observation light path for both (preferably more general: for all) operational states.

Further, the mirror assembly may comprise at least one adjustable mirror, which is configured to be adjusted in at least one of an angle to and a position along the second illumination light path. This may facilitate any readjustment necessary after changing the operational state of the light sheet microscope from the first operational state into the second operational state.

The optical system of the inventive light sheet microscope may comprise a pair of adjustment mirrors, each of which is configured to be adjusted in at least one of an angle to and a position along the first and the second illumination light path. With such a pair of adjustment mirrors not only the position of the light path in the optical element or the tube lens may be adjusted but also the angle under which light path passes through said element.

In another advantageous embodiment of the light sheet microscope, the first optical element may be a first objective, wherein the second optical element may be a second objective and wherein the first objective differs from the second objective in at least one of a numerical aperture;
a free working distance;
a diameter of the pupil; and
a focal length.

Further, an optical axis of the first optical element and an optical axis of the second optical element may be oriented one of essentially parallel to each other;
essentially antiparallel to each other; and
essentially perpendicular to each other.

As explained above, a direction under which the sample volume is observed may be different for different operational states of the light sheet microscope. In the parallel orientation the observation occurs in the same direction for the two (respectively all) operational states of the light sheet microscope, whereas in the antiparallel orientation the direction of observation is opposite, e.g. downwards and upwards for the first operational state and the second operational state, respectively. The third case above refers to an observation of the sample volume from the side, wherein in the other operational state the observation is performed downwards or upwards.

In another advantageous embodiment of the inventive light sheet microscope, the optical system may comprise at least two scan mirrors, which are configured to be adjustable in at least one of angle and position with respect to the first and the second illumination light path and which are configured to scan the first and the second sample volume with a light sheet generated in said sample volume.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine-readable carrier.

Other embodiments comprise the computer program for performing one of the methods described herein, stored on a machine-readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

In the following, the inventive light sheet microscope will be described with reference to the attached figures in the figures, same technical features and features having the same technical effect will be referred to with the same reference numeral. Technical features of different figures may be arbitrarily combined or may be omitted. The figures show exemplary examples of the invention which do not limit the scope of protection which is defined by the claims.

In the following description of the figures, each technical feature is provided with a preceding number that indicates in which figure said technical feature is given. This, however, does not exclude that for instance a feature with, as an example, reference numeral 405 is present in FIG. 1 to FIG. 3. Neither does this reference numeral 405 exclude the presence of said feature in preceding FIGS. 5, 6 etc. One and the same technical feature, which is present in more than one figure may thus be referred to by reference numerals 105, 205, 305, 405, . . . x05, with 'x' being the overall number of figures provided.

Figure 1:
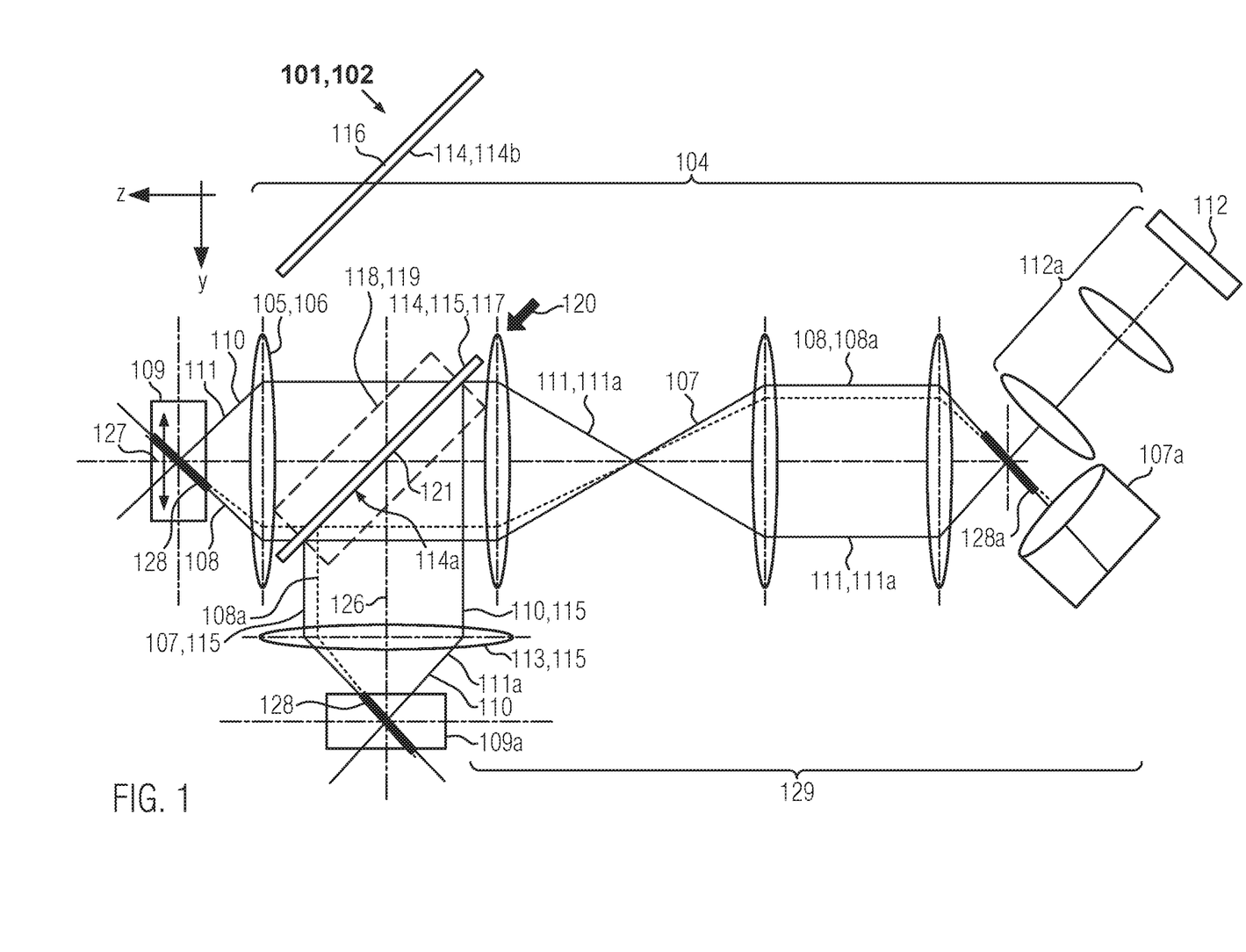
FIG. 1 shows a first exemplary embodiment of an oblique plane microscope according to the present invention.

FIG. 1 shows a light sheet microscope 101, in particular an oblique plane microscope 102, which comprises an optical system 104 with at least one first optical element 105, at least one second optical element 113 and a mirror assembly 114.

FIG. 1 indicates two operational states of the oblique plane microscope 102, namely a first operational state 106, in which the optical system 104 is configured to transmit illumination light 107 from a light source 107 along a first illumination path 108 through the first optical element 105 into a first sample volume 109.

Within the first sample volume 109 a light sheet 128 is generated that illuminates a planar portion within the first sample volume 109.

FIG. 1 also shows a coordinate system indicating directions y and z. in the first operational state 106 the first sample volume 109 is illuminated along the z direction, which may correspond to an illumination from the side. This may for instance be applied when examination of for instance root growth is desired.

Within the first sample volume 109 observation light 110 is generated and transmitted via a first observation light path 111 through the first optical element 105, which generates an oblique virtual image 128a, which is then correctly (i.e. planar and undistorted) imaged by an optical detector assembly 112a onto a detector device 112

In the first operational state 106 the mirror assembly 114 is in the first operational position 116. In the first operational position 116 the mirror assembly 114 is bypassed by the first illumination light path 108, i.e. the mirror assembly 114 may for instance be located in a bypass position 114b, which is indicated in FIG. 1. Different bypass positions 114b, like for instance inside or outside of the drawing plane are conceivable.

The mirror assembly 114 may be moved into a second operational position 117 along an insertion direction 120. This may be performed by a translation device 118 like a linear translation stage 119.

The insertion direction 120 may be oriented parallel to a reflection surface 114a. The insertion direction 120 may also be directed perpendicular to the first illumination light path 108 or essentially perpendicular to a reflection plane 121 at the mirror assembly 114 in the second operational state 115.

In the second operational state 115 of the microscope 101, the optical system 104 is configured to transmit the illumination light 107 along a second illumination light path 108a via the mirror assembly 114. The illumination light 107 is transmitted through the at least one second optical element 113 into a second sample volume 109a. As with the first sample volume 109, the light sheet 128 is generated and the observation light 110 is transmitted along a second observation light path 111a from the second sample volume 109a to the detector device 112.

As shown in FIG. 1, in a first portion 129 of the microscope 101 the first illumination light path 108 at least partially corresponds, overlaps and is collinear with the second illumination light path 108a. Similarly, in the first portion 129, also the first observation light path 111 and the second observation light path 111a are collinear with each other.

Figure 2:
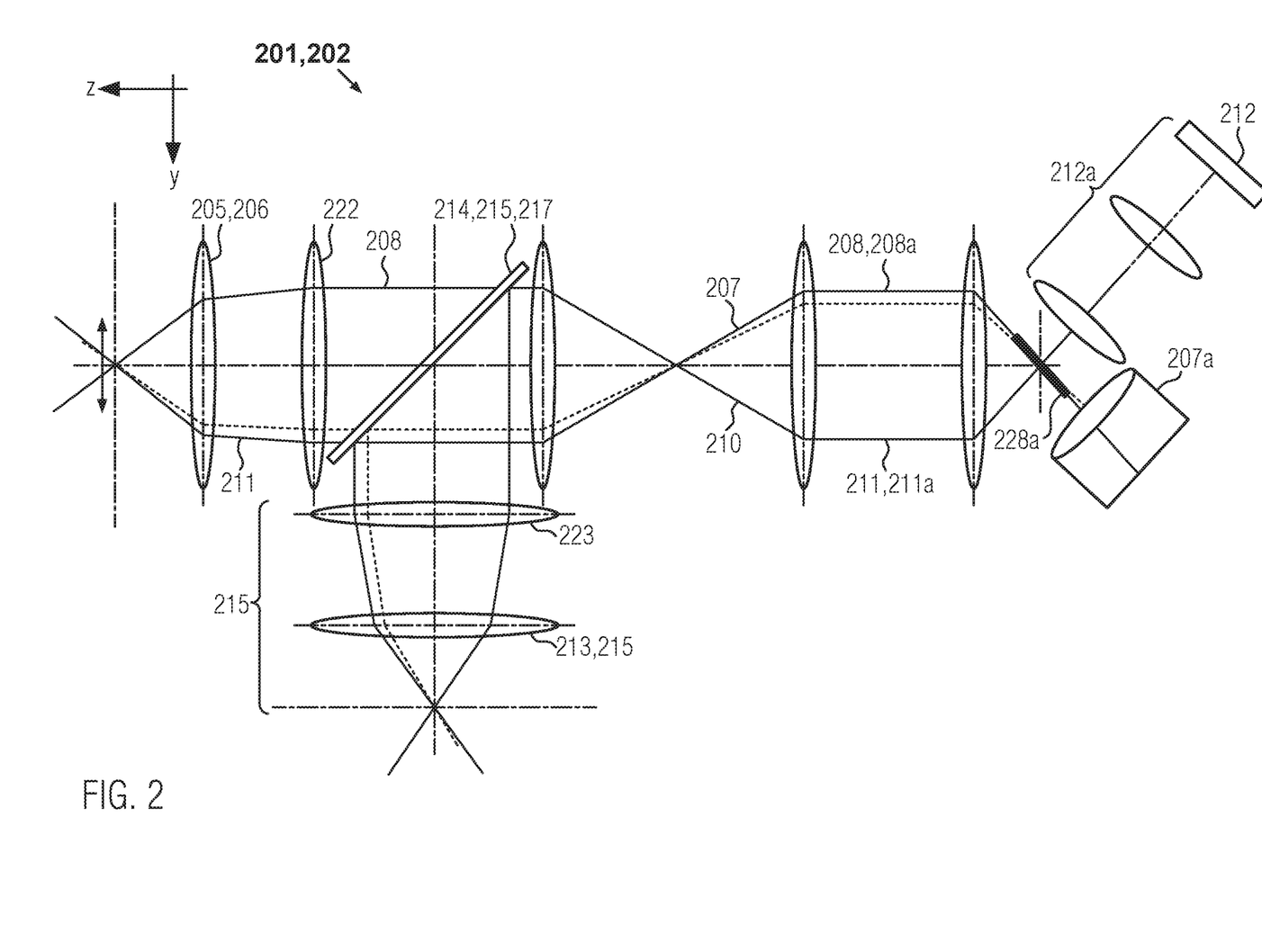
FIG. 2 shows a second exemplary embodiment of an inventive oblique plane microscope according to the present invention.

FIG. 2 shows a second embodiment of the oblique plane microscope 202 that is similar to the one shown in FIG. 1.

The oblique plane microscope 202 of FIG. 2 further comprises a first tube lens 222 and a second tube lens 223. The first tube lens 222 is provided in the first illumination light path 208 as well as in the first observation light path 211.

The second tube lens 223 is applied (i.e. light is transmitted there through) in the second operational state 215, i.e. when the mirror assembly 214 is moved in the second operational position 217.

It is noted that the refraction of the light paths is shown in a schematic manner. Further, the operational state referred to as first operational state 206 may, in a different embodiment of the inventive light sheet microscope 201 correspond to the second operational state 215. Consequently, in this different embodiment of the light sheet microscope 201, the mirror assembly may be provided in the first observation light path 211 and in the first illumination light path 208 in the first operational state 206, whereas the mirror assembly 214 may be bypassed in the second operational state 215.

Figure 3:
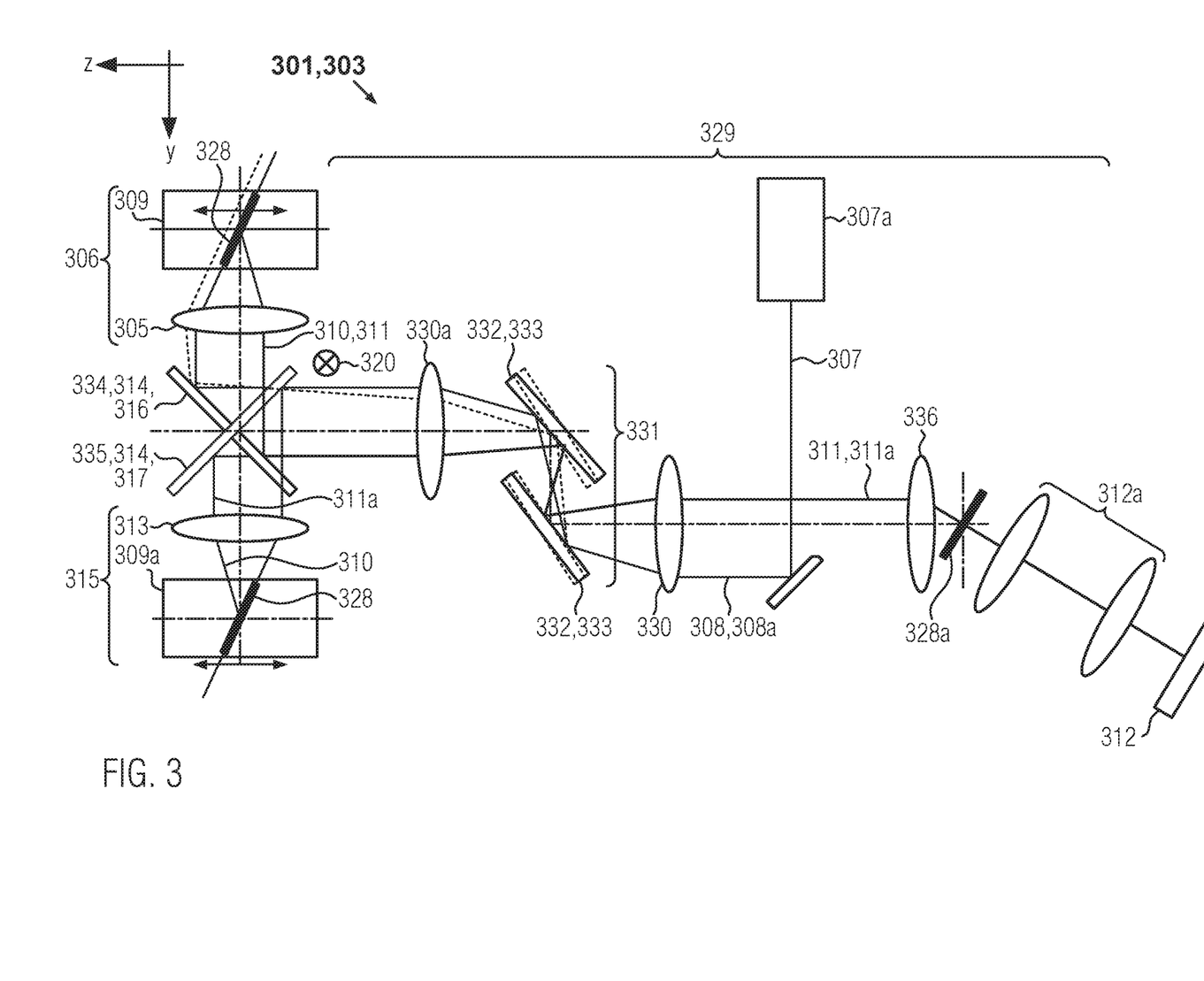
FIG. 3 shows a first exemplary embodiment of an inventive SCAPE microscope according to the present invention.

FIG. 3 shows an inventive light sheet microscope 301 in the form of a scape microscope 303.

The SCAPE microscope 303 comprises the light source 307a providing the illumination light 307 along the first illumination light path 308. Again, in the first portion 329, the first illumination light path 308 is collinear with the second illumination light path 308a.

The illumination light 307 is transmitted via a further tube lens 330 onto a pair 331 of adjustment mirrors 332, which may at the same time be scan mirrors 333 for scanning the first sample volume 309 or the second sample volume 309a.

The embodiment shown in FIG. 3 shows a second further tube lens 330a.

The mirror assembly 314 is shown in the first operational position 316 and in the second operational position 317. In the first operational state 306 the first sample volume 309 is observed from below, whereas in the second operational state 315, the second sample volume 309a is observed from above.

For each operational state 306, 315 a separate optical element, namely the first optical element 305 and the second optical element 313 is provided.

The first operational position 316 and the second operational position 317 of the mirror assembly 314 are drawn overlapped, wherein the mirror assembly 314 in the first operational position 316 shows a first mirror 334 and the mirror assembly 314 in the second operational position 317 shows a second mirror 335. FIG. 3 thus does not show one and the same mirror in different positions 316, 317.

By moving the mirror assembly 314 along the insertion direction 320, which is inside the drawing plane in this embodiment, either the first mirror 334 or the second mirror 335 of the mirror assembly 314 may be inserted into the light paths.

The generation of the light sheet 328 and collecting of observation light 310 which is then transmitted via either a first observation light path 311 or via the second observation light path 311a occurs similar as described in the previous figures. In the first portion 329, the first illumination light path 308 and the second illumination light path 308a, as well as the first observation light path 311 and the second observation light path 311a are collinear with each other.

The optical detector assembly 312a images the oblique virtual image 328a onto the detector device 312, wherein the SCAPE microscope 303 further comprises a further objective 336 that images that oblique virtual image 328a.

Figure 4:
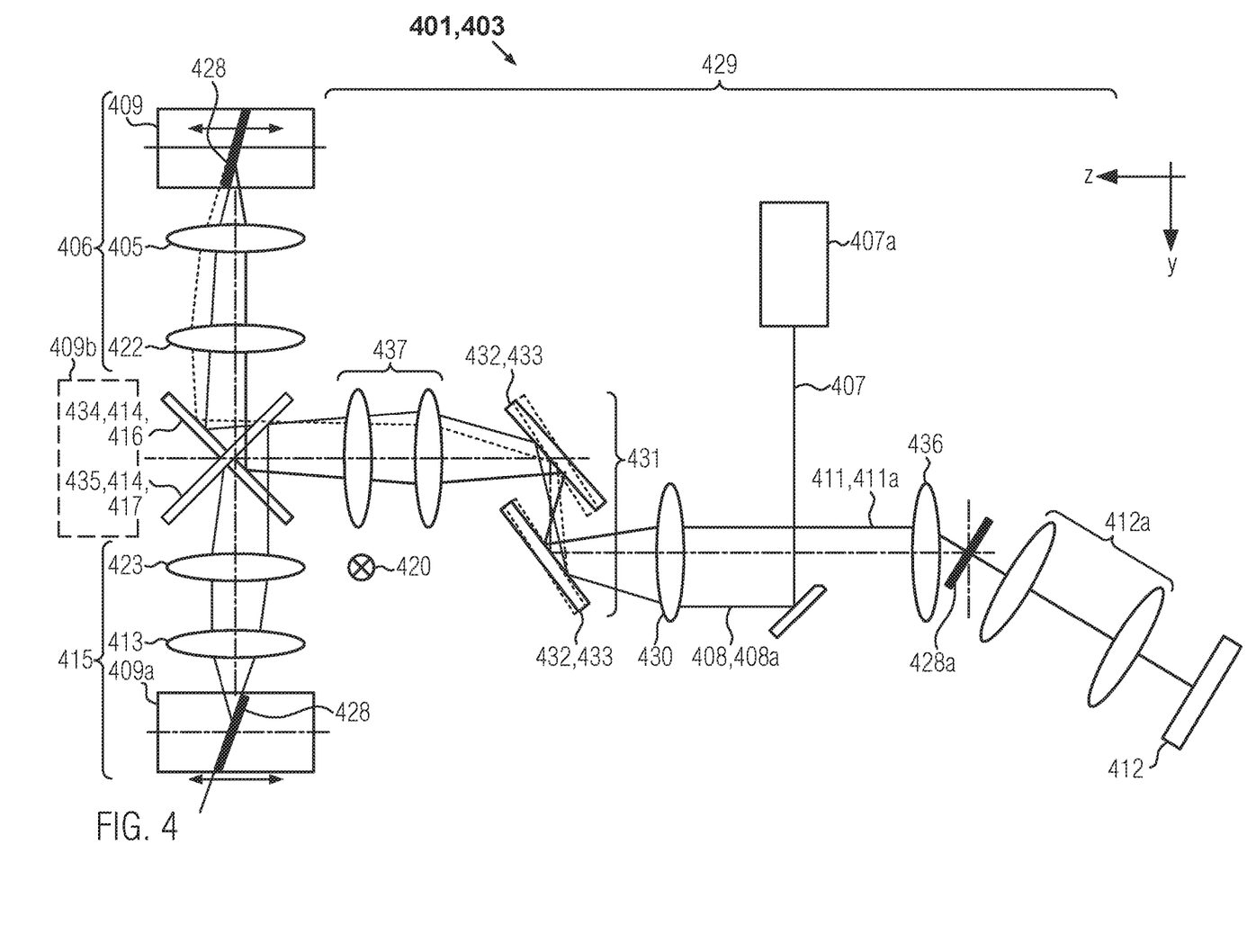
FIG. 4 shows a second exemplary embodiment of an inventive SCAPE microscope according to the present invention.

FIG. 4 also shows a SCAPE microscope 403, wherein there is not a second further tube lens 330a provided as in FIG. 3, but a telescope 437. Further, the SCAPE microscope 403 of FIG. 4 provides the first tube lens 422 and the second tube lens 423 in between the first optical element 405 and the mirror assembly 414 or between the second optical element 413 and the mirror assembly 414.

Also in this embodiment, the mirror assembly 414 is moved along the insertion direction 420 into the illumination light path 408, 408a. The first tube lens 422 and the second tube lens may be moved together with the mirror assembly 414 along the insertion direction 420.

Again, the mirror assembly 414 comprises a first mirror 434, which is provided in the beam paths in the first operational state 406, and a second mirror 435, which is provided in the beam paths in the second operational state 415.

It is further conceivable, that the microscopes 101, 201, 301, 401 and in particular their position of the first sample volume 109-409 and the second sample volume 109a-409a may be combined. Thus, the SCAPE microscope 403 of FIG. 4 may, in a different embodiment, provide three operational states and may thus combine three operational positions of the mirror assembly 414, wherein three different sample volumes may be provided, e.g. the first 409, the second 409a and a third sample volume 409b. The third sample volume 409b is indicated in FIG. 4 with a dashed line.

The light sheet microscopes 101-401 thus allow to switch between different optical elements 105-405 and 113-413 (for observation in the third sample volume 409b a third optical element would be necessary) in order to observe a sample volume with different parameters and/or from a different direction. When the operational state of the light sheet microscope 101-401 is changed, different illumination light paths and observation light paths are selected. Within those different light paths, optical components like the optical element and the tube lens are pre-adjusted, such that no readjustment is necessary after the operational state is changed.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 101 light sheet microscope
102 oblique plane microscope
103 SCAPE microscope
104 optical system
105 first optical element
106 first operational state
107 illumination light
107a light source
108 first illumination light path
108a second illumination light path
109 first sample volume
109a second sample volume
110 observation light
111 first observation light path
111a second observation light path
112 detector device
112a optical detector assembly
113 second optical element
114 mirror assembly
114a reflection surface
114b bypass position
115 second operational state
116 first operational position
117 second operational position
118 translation device
119 linear translation stage
120 insertion direction
121 reflection plane
122 first tube lens
123 second tube lens
124 first objective
125 second objective
126 optical axis of the first optical element
127 optical axis of the second optical element
128 light sheet
128a oblique virtual image
129 first portion
330 further tube lens
330a second further tube lens
331 pair
332 adjustment mirror
333 scan mirror
334 first mirror
335 second mirror
336 further objective
409b third sample volume

The invention claimed is:

1. A light sheet microscope comprising:
an optical system with at least one first optical element, at least one second optical element and a mirror assembly, wherein:
in a first operational state of the microscope, the optical system is configured to transmit illumination light along a first illumination light path through the at least one first optical element into a first sample volume, and configured to transmit observation light along a first observation light path from the first sample volume to a detector device, and
in a second operational state of the microscope, the optical system is configured to transmit the illumination light along a second illumination light path via the mirror assembly through the at least one second optical element into a second sample volume, and configured to transmit observation light along a second observation light path from the second sample volume to the detector device, wherein the second sample volume is not co-located with the first sample volume.

2. The light sheet microscope according to claim 1, wherein the mirror assembly, in the first operational state, is in a first operational position and, in the second operational state, is moved into a second operational position.

3. The light sheet microscope according to claim 2, wherein, in the first operational position, the first illumination light path bypasses the mirror assembly.

4. The light sheet microscope according to claim 2, wherein the mirror assembly is configured to be at least one of linearly moveable or rotatable from the first to the second operational position.

5. The light sheet microscope according to claim 2, wherein, in the first operational state, the first illumination light path and the first observation light path bypass the mirror assembly, and wherein, in the second operational state, the mirror assembly is located in the second illumination light path and in the second observation light path.

6. The light sheet microscope according to claim 2, wherein the mirror assembly is configured to be moved along an insertion direction into the first illumination light path, and wherein the insertion direction is one of: essentially perpendicular to the first illumination light path, essentially parallel to a reflection surface of the mirror assembly, or essentially perpendicular to a reflection plane at the mirror assembly in the second operational state.

7. The light sheet microscope according to claim 1, wherein the optical system comprises a first tube lens and a second tube lens, wherein the first tube lens is provided in the first illumination light path, and wherein the second tube lens is provided in the second illumination light path.

8. The light sheet microscope according to claim 7, wherein at least one of the second tube lens and the at least one second optical element is configured to be moved together with the mirror assembly from the first operational position into the second operational position, wherein, in the second operational position, the second tube lens and/or the at least one second optical element is inserted into the second illumination light path.

9. The light sheet microscope according to claim 7, wherein, in the first illumination light path, the first tube lens of the optical system is located between the at least one first optical element and the second operational position of the mirror assembly.

10. The light sheet microscope according to claim 7, wherein a ratio of focal lengths of the second optical element and the second tube lens is essentially equal to a ratio of focal lengths of the at least one first optical element and the first tube lens.

11. The light sheet microscope according to claim 1, wherein the mirror assembly comprises at least one adjustable mirror configured to be adjusted in at least one of: an angle to the second illumination path or a position along the second illumination light path.

12. The light sheet microscope according to claim 1, wherein the optical system comprises a pair of adjustment mirrors, each of which is configured to be adjusted in at least one of: an angle to the first and the second illumination light path or a position along the first and the second illumination light path.

13. The light sheet microscope according to claim 1, wherein the first optical element is a first objective, wherein the second optical element is a second objective, and wherein the first objective differs from the second objective in at least one of: a numerical aperture, a free working distance, a diameter of the pupil, or a focal length.

14. The light sheet microscope according to claim 1, wherein an optical axis of the first optical element and an optical axis of the second optical element are oriented one of: essentially parallel to each other, essentially antiparallel to each other, or essentially perpendicular to each other.

15. The light sheet microscope according to claim 1, wherein the optical system comprises at least two scan mirrors, which are configured to be adjustable in at least one of angle and position with respect to the first and the second illumination light path and which are configured to scan the first and the second sample volume with a light sheet generated in the sample volume.

* * * * *